(12) United States Patent
Zhen

(10) Patent No.: US 11,314,426 B2
(45) Date of Patent: Apr. 26, 2022

(54) METHOD, SYSTEM, AND APPARATUS FOR ALLOCATING HARD DISKS TO PLACEMENT GROUP, AND STORAGE MEDIUM

(71) Applicant: ZHENGZHOU YUNHAI INFORMATION TECHNOLOGY CO., LTD., Henan (CN)

(72) Inventor: Tianqiao Zhen, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 0 days.

(21) Appl. No.: 16/981,708

(22) PCT Filed: Oct. 26, 2018

(86) PCT No.: PCT/CN2018/112052
§ 371 (c)(1),
(2) Date: Sep. 17, 2020

(87) PCT Pub. No.: WO2020/000817
PCT Pub. Date: Jan. 2, 2020

(65) Prior Publication Data
US 2021/0365192 A1   Nov. 25, 2021

(30) Foreign Application Priority Data

Jun. 28, 2018   (CN) .......................... 201810689442.X

(51) Int. Cl.
*G06F 3/06* (2006.01)

(52) U.S. Cl.
CPC .......... *G06F 3/0631* (2013.01); *G06F 3/0604* (2013.01); *G06F 3/0676* (2013.01)

(58) Field of Classification Search
CPC ..... G06F 3/0631; G06F 3/0676; G06F 3/0604
See application file for complete search history.

(56) References Cited

U.S. PATENT DOCUMENTS

2005/0114593 A1* 5/2005 Cassell ................. G06F 3/0689
                                                          711/114
2011/0153917 A1   6/2011 Maita et al.
(Continued)

FOREIGN PATENT DOCUMENTS

| CN | 106055277 A | 10/2016 |
| CN | 107977319 A | 5/2018 |

OTHER PUBLICATIONS

International Search Report for PCT/CN2018/112052 dated Mar. 19, 2019, ISA/CN.

*Primary Examiner* — Mark A Giardino, Jr.
(74) *Attorney, Agent, or Firm* — Yue (Robert) Xu; Apex Attorneys at Law, LLP

(57) ABSTRACT

A method, a system, an apparatus for allocating a hard disk to a placement group, and a storage medium. An allocated placement group count of each candidate hard disk in a pool of candidate hard disks is acquired, where the allocated placement group count is increased by one count unit, each time said hard disk is allocated to any placement group. A table of allocated placement group counts is established based on the allocated placement group count, where the table reflects a correspondence between candidate hard disks and placement group counts. Candidate hard disks are selected from the table based on an ascending order of the allocated placement group count, to obtain target hard disks, where a quantity of the candidate hard disks is equal to a quantity of hard disks required by a target placement group. The target hard disks are allocated to the target placement group.

18 Claims, 3 Drawing Sheets

(56) References Cited

U.S. PATENT DOCUMENTS

| | | | |
|---|---|---|---|
| 2011/0202723 A1* | 8/2011 | Yochai | G06F 3/0631 |
| | | | 711/114 |
| 2014/0297982 A1 | 10/2014 | Duzett | |
| 2015/0378637 A1* | 12/2015 | Takamura | G06F 3/0631 |
| | | | 711/114 |
| 2018/0113620 A1 | 4/2018 | Kwon et al. | |

* cited by examiner

METHOD, SYSTEM, AND APPARATUS FOR ALLOCATING HARD DISKS TO PLACEMENT GROUP, AND STORAGE MEDIUM

This application is the national phase of International Application No. PCT/CN PCT/CN2018/112052, titled "METHOD, SYSTEM, AND APPARATUS FOR ALLOCATING HARD DISKS BELONGING TO PLACEMENT GROUP, AND STORAGE MEDIUM", filed on Oct. 26, 2018, which claims priority to Chinese Patent Application No. 201810689442.X, titled "METHOD, SYSTEM, AND APPARATUS FOR ALLOCATING HARD DISK TO PLACEMENT GROUP, AND STORAGE MEDIUM", filed on Jun. 28, 2018 with the China National Intellectual Property Administration, which is incorporated herein by reference in its entirety.

FIELD

The present disclosure relates to the technical field of balanced distribution of data, and in particular, to a method, a system, and an apparatus for allocating a hard disk to a placement group, and a computer readable storage medium.

BACKGROUND

A distributed storage system includes multiple storage pools. Each storage pool is provided with a corresponding rule of data distribution, such as a copy rule or an erasure rule. In the copy rule, copy data completely identical to an original data file is formed, that is, backup is stored in a form of a complete data file. An erasure rule of 4+2 is taken as an example, where complete data is divided into four pieces that are different from each other, and two pieces of redundant data is calculated based on such four pieces of data through a preset erasure algorithm. Then, the six pieces of data are stored. Afterwards, the original data can be recovered at any time, as long as any four pieces of data can be read from the six pieces of data.

Generally, metadata is small in data size and highly important, and therefore is usually stored in a copy storage pool formed based on the copy rule. A complete data file is stored in an erasure storage pool. In order to facilitate management of data distribution, a storage pool is generally divided into multiple placement groups (PGs). Each placement group includes several hard disks according to the copy rule or the erasure rule. For example, it is necessary to store six pieces of data for the erasure rule of 4+2, and thereby generally, six hard disks are required to store the six pieces of data. Namely, each placement group would include six hard disks. Distribution of the placement group on the hard disks directly determines evenness of data distribution in a cluster.

A hard disk is usually selected through a stochastic algorithm, in a conventional strategy for allocating a hard disk to a placement group. The stochastic algorithm is only capable to ensure a limited randomness of distribution of the placement group on hard disks. A method for allocating hard disks based on the stochastic algorithm cannot meet an increasingly high requirement on evenness of data distribution. Hence, it is necessary to further improve the evenness of data distribution.

Therefore, an urgent problem to be solved by those skilled in the art is how to address technical defects in conventional methods and provide a more reasonable method, for allocating hard disks to a placement group, so as to improve the evenness of data distribution.

SUMMARY

An object of the present disclosure is to provide a method for allocating a hard disk to a placement group. A concept of an allocated placement group count is introduced. That is, each time a hard disk is allocated to a placement group, the allocated placement group count of the hard disk is increased by one counting unit. Accordingly, a table of allocated placement group counts, which reflects the allocated placement group count of each candidate hard disk, is established for selecting a certain quantity of target hard disks based on an ascending order of the allocated placement group count. The target hard disk is smaller than other candidate hard disks in the allocated placement group count, indicating that a small quantity of placement groups is borne on each target hard disk. Hence, the target hard disk is more suitable to serve as a member hard disk in a new placement group. Evenness of data distribution is improved due to a more even distribution of the placement group on hard disks.

Another object of the present disclosure is to provide a system for allocating a hard disk to a placement group, an apparatus for allocating a hard disk to a placement group, and a computer readable storage medium.

In order to achieve the aforementioned object, a method for allocating a hard disk to a placement group is provided according to an embodiment of the present disclosure. The method includes:

acquiring an allocated placement group count of each candidate hard disk in a pool of candidate hard disks, where the allocated placement group count of each hard disk is increased by one count unit, each time said hard disk is allocated to any placement group;

establishing a table of allocated placement group counts based on the allocated placement group count, where the table reflects a correspondence between each candidate hard disk and the corresponding placement group count;

selecting one or more candidate hard disks from the table, based on an ascending order of the allocated placement group count, to obtain one or more target hard disks, where a quantity of the one or more candidate hard disks is equal to a quantity of hard disks required by a target placement group; and allocating the one or more target hard disks to the target placement group.

In an embodiment, selecting the one or more candidate hard disks from the table based on the ascending order of the allocated placement group count to obtain the one or more target hard disk includes:

selecting two candidate hard disks from the table based on the ascending order, repeatedly, until a quantity of the one or more target hard disks is equal to the quantity of the required hard disks, where the two candidate hard disks are consecutive in the ascending order;

determining whether the two candidate hard disks are located in a same storage device;

determining both of the two candidate hard disks as the target hard disks, in a case that the two candidate hard disks are not located in the same storage device; and selecting either of the two candidate hard disks as the target hard disk, in a case that the two candidate hard disks are located in the same storage device.

In an embodiment, the method for allocating the hard disk to the placement group further includes:

for each hard disk, determining whether said hard disk meets a predetermined adding rule for the pool candidate hard disks, where the predetermined adding rule includes at least one of: an interval between a moment of a last increase of the allocated placement group count and a current moment being greater than a predetermined interval, the allocated placement group count being less than an upper limit, or a current occupancy rate of said hard disk being less than a threshold; and adding said hard disk into the pool of candidate hard disks as a candidate hard disk, in response to said hard disk meeting the predetermined adding rule.

In an embodiment, the method for allocating the hard disk to the placement group further includes:

determining, for each placement group, a hard disk with a maximum allocated placement group count, to obtain to-be-replaced hard disk, in response to a new hard disk being added to a storage system; and replacing the to-be-replaced hard disk in each placement group with the new hard disk.

In order to achieve the aforementioned object, a system for allocating a hard disk to a placement group is further provided according to an embodiment of the present disclosure. The system includes:

an acquiring unit for allocated placement group counts of candidate hard disks, configured to acquire an allocated placement group count of each candidate hard disk in a pool of candidate hard disks, where the allocated placement group count of each hard disk is increased by one count unit, each time said hard disk is allocated to any placement group;

an establishing unit for table of allocated placement group counts, configured to establish a table of allocated placement group counts based on the allocated placement group count, where the table reflects a correspondence between each candidate hard disk and the corresponding placement group count;

a selecting unit for hard disks of small placement group counts, configured to selecting one or more candidate hard disks from the table, based on an ascending order of the allocated placement group count, to obtain one or more target hard disks, where a quantity of the one or more candidate hard disks is equal to a quantity of hard disks required by a target placement group; and an allocating unit for target hard disks, configured to allocate the one or more target hard disks to the target placement group.

In an embodiment, the selecting unit for hard disks of small placement group counts includes:

a selecting subunit for two consecutive candidate hard disks, configured to select two candidate hard disks from the table based on the ascending order, repeatedly, until a quantity of the one or more target hard disks is equal to the quantity of the required hard disks, where the two candidate hard disks are consecutive in the ascending order;

a determining subunit for same storage devices, configured to determine whether the two candidate hard disks are located in a same storage device;

a processing subunit for different storage devices, configured to determine both of the two candidate hard disks as the target hard disks, in a case that the two candidate hard disks are not located in the same storage device; and a processing subunit for same storage devices, configured to select either of the two candidate hard disks as the target hard disk, in a case that the two candidate hard disks are located in the same storage device.

In an embodiment, the system for allocating the hard disk to the placement group further includes:

a judging unit for candidate hard disks, configured to: for each hard disk, determine whether said hard disk meets a predetermined adding rule for the pool candidate hard disks, where the predetermined adding rule includes at least one of: an interval between a moment of a last increase of the allocated placement group count and a current moment being greater than a predetermined interval, the allocated placement group count being less than an upper limit, or a current occupancy rate of said hard disk being less than a threshold; and a determining unit for candidate hard disks, configured to: for each hard disk, add said hard disk into the pool of candidate hard disks as a candidate hard disk, in response to said hard disk meeting the predetermined adding rule.

In an embodiment, the system for allocating the hard disk to the placement group further includes:

a determining unit for to-be-replaced hard disks, configured to: determine, for each placement group, a hard disk with a maximum allocated placement group count, to obtain a to-be-replaced hard disk, in response to a new hard disk being added to a storage system; and a replacing unit, configured to replace the to-be-replaced hard disk with the new hard disk, for each placement group.

In order to achieve the aforementioned object, an apparatus for allocating a hard disk to a placement group is further provided according to an embodiment of the present disclosure. The device includes:

a memory, configured to store a computer program; and a processor, configured to implement the aforementioned method for allocating the hard disk to the placement group when executing the computer program.

In order to achieve the aforementioned object, a computer readable storage medium is further provided according to an embodiment of the present disclosure. The computer readable storage medium stores a computer program, where the computer program when being executed by a processor implements the aforementioned method for allocating the hard disk to the placement group.

The method for allocating the hard disk to the placement group is provided according to embodiments of the present disclosure. An allocated placement group count of each candidate hard disk in a pool of candidate hard disks is acquired, where the allocated placement group count of each hard disk is increased by one count unit, each time said hard disk is allocated to any placement group. A table of allocated placement group counts is established based on the allocated placement group count, where the table reflects a correspondence between each candidate hard disk and the corresponding placement group count. One or more candidate hard disks are selected from the table based on an ascending order of the allocated placement group count, to obtain one or more target hard disks, where a quantity of the one or more candidate hard disks is equal to a quantity of hard disks required by a target placement group. The one or more target hard disks are allocated to the target placement group.

Apparently, a concept of an allocated placement group count is introduced in the method. That is, each time a hard disk is allocated to a placement group, the allocated placement group count of the hard disk is increased by one counting unit. Accordingly, a table of allocated placement group counts, which reflects the allocated placement group count of each candidate hard disk, is established for selecting a certain quantity of target hard disks based on an ascending order of the allocated placement group count. The target hard disk is smaller than other candidate hard disks in the allocated placement group count, indicating that a small quantity of placement groups is borne on each target hard disk. Hence, the target hard disk is more suitable to serve as a member hard disk in a new placement group. Evenness of data distribution is improved due to a more even distribution of the placement group on hard disks. A system and an apparatus for allocating a hard disk to a placement group, and a computer readable storage medium are further provided with the above beneficial effects according to embodiments of the present disclosure, and the beneficial effects not repeated herein.

DETAILED DESCRIPTION OF EMBODIMENTS

A core of the present disclosure is to provide a method for allocating a hard disk to a placement group. In the method, a concept of an allocated placement group count is introduced. That is, each time a hard disk is allocated to a placement group, the allocated placement group count of the hard disk is increased by one counting unit. Accordingly, a table of allocated placement group counts, which reflects the allocated placement group count of each candidate hard disk, is established for selecting a certain quantity of target hard disks based on an ascending order of the allocated placement group count. The target hard disk is smaller than other candidate hard disks in the allocated placement group count, indicating that a small quantity of placement groups is borne on each target hard disk. Hence, the target hard disk is more suitable to serve as a member hard disk in a new placement group. Evenness of data distribution is improved due to a more even distribution of the placement group on hard disks. A system and an apparatus for allocating a hard disk to a placement group, and a computer readable storage medium are further provided with the above beneficial effects according to embodiments of the present disclosure.

In order to make objectives, technical schemes and advantages of the present disclosure clearer, hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

First Embodiment

Figure 1:
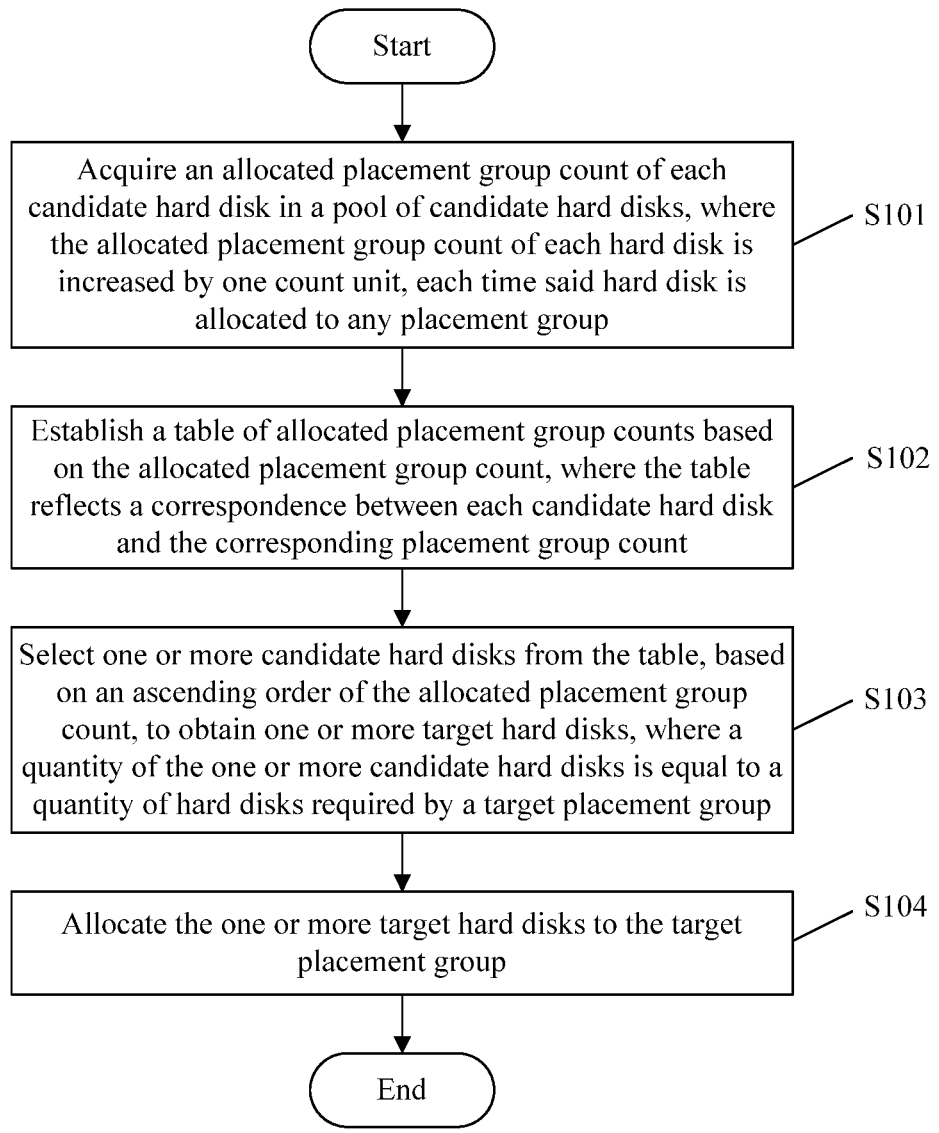
FIG. 1 is a flowchart of a method for allocating a hard disk to a placement group according to an embodiment of the present disclosure.

Hereinafter reference is made to FIG. 1, which is a flowchart of a method for allocating a hard disk to a placement group according to an embodiment of the present disclosure. The method includes steps S101 to S104.

In step S101, an allocated placement group count of each candidate hard disk in a pool of candidate hard disks is acquired. Each time a hard disk is allocated to any placement group, the allocated placement group count of such hard disk is increased by one count unit.

A concept of "allocated placement group count" is introduced herein. As implied by the name, the concept refers to as a quantity of placement groups to which a hard disk is allocated. That is, each time a hard disk is allocated to a placement group, the allocated placement group count of such hard disk is increased by one count unit.

This step aims at acquiring the allocated placement group count of each candidate hard disk in the pool of candidate hard disks. The pool of candidate hard disks is an assemblage of all candidate hard disks. The candidate hard disk may be interpreted as a hard disk in a state of being to-be-allocated, and the candidate hard disk is capable to be allocated for data storage to a newly established placement group.

Further, a mechanism for discriminating the candidate hard disk may be set, to determine whether each hard disk can be added into the pool of candidate hard disks as the candidate hard disk for subsequent allocation processing. The mechanism may be set in different manners based on different principles. For example, an interval between moments at which the hard disk is allocated to different placement groups may be set, in order to prevent a hard disk from being frequently allocated to multiple placement groups within a short period. That is, the hard disk cannot be allocated to a new placement group before the interval lapses since the last moment when the hard disk is allocated to a placement group. Further, a maximum quantity of placement groups to which a hard disk can be allocated within a period may be set. Or, the determination may be based on whether the hard disk is currently in an abnormal state, or the like. A specific manner is not limited herein. A main object of setting the mechanism is improving evenness of data distribution. Such object may suggest different solve solutions that are flexibly selected in practical applications, which are not enumerated herein.

In step S102, a table of allocated placement group counts is established based on the allocated placement group count, where the table reflects a correspondence between each candidate hard disk and the corresponding placement group count.

On a basis of the step S101, the step S102 aims at establishing the table of allocated placement group counts that reflects a correspondence between all hard disks and all allocated placement group counts. That is, each relation in the correspondence is between an identification of a hard disk and the allocated placement group count of the hard disk corresponding to the identification. In specific embodiments, the allocated placement group count may be in various forms. The allocated placement group count may be in a form of a numerical number, a binary code, or the like. An object is determining a quantity of placement groups to which the hard disk is allocated based on the corresponding allocated placement group count.

Attribute information of each hard disk may be further linked, on a basis of the correspondence provided in this step. The attribute information may include a storage device to which the hard disk belongs, a date of manufacture, a time when the hard disk is added into a cluster, a log, or other information. It is facilitated that other state information of the hard disk can be determined based on the additional information that is linked, and other determination may be made accordingly.

In step S103, one or more candidate hard disks are selected from the table based on an ascending order of the allocated placement group count, to obtain one or more target hard disks, where a quantity of the one or more candidate hard disks is equal to a quantity of hard disks required by a target placement group.

On a basis of the step S102, the step S103 aims at selecting a predetermined quantity of candidate hard disks from the table of allocated placement group counts, and determining the selected candidate hard disks as the target hard disks to be allocated to the target placement group. The selection follows a rule that a candidate hard disk with a smaller allocated placement group count is selected. Evenness of data distribution should be as high as possible in allocating selected hard disk to the target placement group. Therefore, it is necessary to select candidate hard disks having smaller allocated placement group counts, rather than selecting candidate hard disks randomly or selecting candidate hard disks having larger allocated placement group counts to be the target hard disks.

Herein the candidate hard disks having smaller allocated placement group counts may be understood in conjunction with a following example.

It is assumed that the table of allocated placement group counts includes the allocated placement group counts of 20 candidate hard disks, and the quantity of hard disks required by a target placement group is 5. That is, five candidate hard disks are required to be allocated to the target placement group, so as to implement such placement group. In such case, five candidate hard disks are selected based on an ascending order of the allocated placement group counts. Herein the wording is not expressed as that candidate hard disks corresponding to the five smallest allocated placement group counts are selected, due to a following reason. Generally, the word "smallest" may refer to only one of the allocated placement group counts, and there may be only one smallest allocated placement group count among the selected five. In comparison, the five hard disks selected based on the ascending order of the allocated placement group counts refer to five hard disks having smaller counts among the twenty hard disks, and it is impossible to select another five disks having a count smaller than those of such five disks.

It is appreciated that there are various manners for selecting the candidate hard disks that are same as the required hard disks in quantity. The foregoing example shows a manner in which all required hard disks are selected once together. Alternatively, one candidate hard disk currently having a smallest allocated placement group count may be selected each time. A basic requirement for a next selection is that the newly selected hard disk is different from the previously selected disk, and thereby another candidate hard disk having a smallest allocated placement group count can further be found for the next selection. Such operation is repeated until candidate hard disks with the same quantity as the required hard disks are obtained as the target hard disks. In another embodiment, when a suitable target hard disk is selected for the target placement group each time, a certain quantity of candidate hard disks may be randomly selected according to a selecting algorithm, instead of selecting one candidate hard disk having the smallest allocated placement group count from the table of allocated placement group counts including all candidate hard disks. For example, three candidate hard disks may be randomly selected from the table each time, and a candidate hard disk having the smallest allocated placement group count among the three candidate hard disks is selected. Although evenness of data distribution may be sacrificed, time for selection can be reduced in such manner. Whether the selection adopts such manner may be flexibly determined based on a specific requirement on evenness of data distribution and time consumption, and is not specifically limited herein.

Further, a unit of a storage device applied in practice is usually a storage device including multiple hard disks, instead of a single hard disk. For example, a storage device may be a disk array, a storage server, or the like. The disk array or the storage server may include a large number of hard disks. In a case that all hard disks included in one placement group are different hard disks in a same storage device, the whole placement group may malfunction due to a single node fault when the storage device fails. Therefore, candidate hard disks located in different storage devices may be determined and selected, based on hard disk attribute information described in the step S102. A general principle is still selecting hard disks having smaller allocated placement group counts. Those skilled in the art may obtain multiple implementations under such principle, and the implementations are not described in detail herein.

In step S104, the one or more target hard disks are allocated to the target placement group.

On a basis of the step S103, the step S104 aims at allocating the determined target hard disk to the target placement group. As described in the step S103, the target hard disk may be selected in different manners. Accordingly, the target hard disks may be allocated to the target placement group in different manners, which may include allocating all target hard disks to the target placement group once together, or allocating one target hard disk to the target placement group each time until a quantity of the allocated target hard disks meets a requirement of the target placement group. In the latter manner of allocation, the target placement group cannot undertake a data storage task until the obtained target hard disks are same as the required hard disks in quantity.

Further, each time a new hard disk (of which the allocated placement group count is zero) is added to a storage system, a hard disk having the largest allocated placement group count in each placement group may be replaced with the new hard disk, in order to improve evenness of data distribution in a cluster. The replacement is performed until a quantity of placement groups to which the new hard disk is allocated is same as a quantity of placement groups on the pre-replacement hard disks in the storage system.

For example, a storage system includes two placement groups currently. A first placement group includes six hard disks, among which a No. 003 hard disk has the largest allocated placement group count. A second placement group includes five hard disks, among which a No. 006 hard disk has the largest allocated placement group count. Therefore, the hard disk having the largest allocated placement group count in each placement group is replaced with the new hard disk in a following manner. The new hard disk (No. 020) is allocated to the first placement group by replacing the No. 003 hard disk, and an allocation relationship between the No. 003 hard disk and the first placement group is terminated. The new hard disk (No. 020) is allocated to the second placement group by replacing the No. 006 hard disk, and an allocation relationship between the No. 006 hard disk and the first placement group is terminated.

In a case that there are a large number of placement groups, multiple allocation relationships between a replaced original hard disk and different placement groups may be terminated. The allocated placement group count of the replaced original hard disk may be smaller than that of the new hard disk, after adding new allocation relationships and terminating old ones. In such case, replacement between hard disks is strictly based on magnitudes of the allocated placement group counts, in view of the principle of distributing data as evenly as possible. It is appreciated that data is stably stored in the new hard disk, leading to a high stability. Thereby, the new hard disk may be allocated to more placement groups when appropriate. In practice, many other factors are required to be considered, and a suitable manner may be flexibly selected based on a practical scenario, which is not limited herein.

Based on the above technical solution, in the method for allocating a hard disk to a placement group according to an embodiment of the present disclosure, a concept of allocated placement group count is introduced, that is, each time a hard disk is allocated to a placement group, an allocated placement group count of the hard disk is increased by one count unit and an table of allocated placement group counts reflecting allocated placement group counts of all candidate hard disks is established based on the allocated placement group counts so as to select a certain number of target hard disks in an ascending order of values of the allocated placement group counts. The target hard disks have smaller allocated placement group counts than other candidate hard disks, which indicates that the number of placement groups to which each of the target hard disks is allocated is less than the number of placement groups to which each of other candidate hard disks is allocated. Therefore, the target hard disks are suitable to form a new placement group. Since hard disk distribution of the placement group is even, evenness of data distribution is improved.

Second Embodiment

Figure 2:
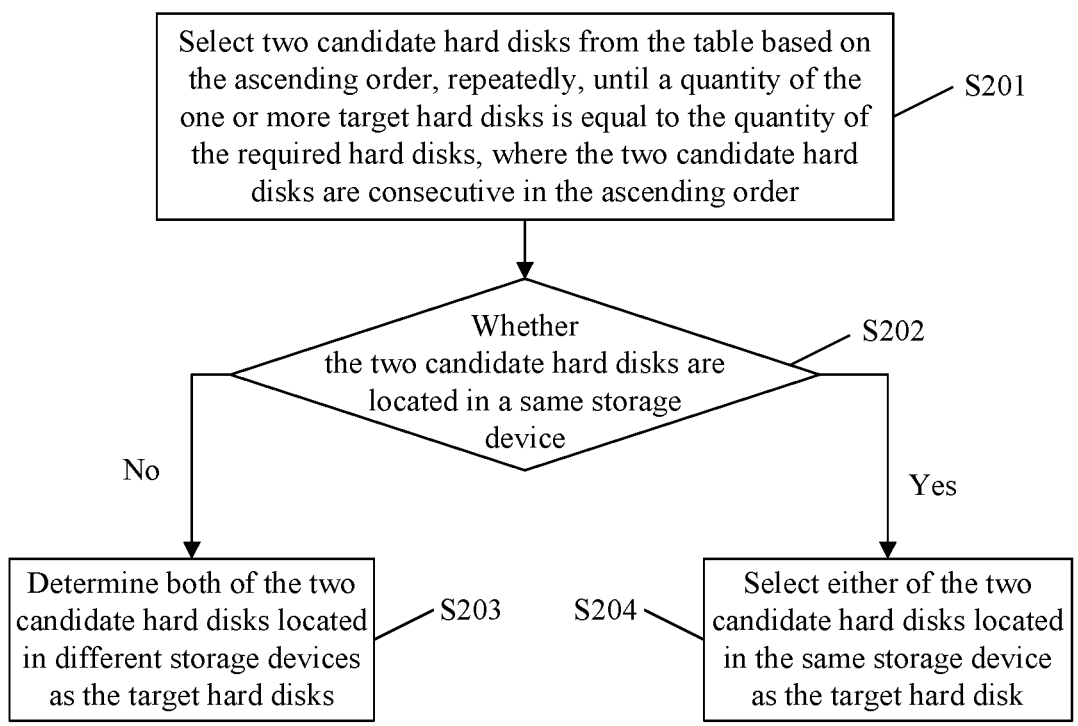
FIG. 2 is a flowchart of selecting a candidate hard disk with a small allocated placement group count in a method for allocating a hard disk to a placement group according to an embodiment of the present disclosure.

Hereinafter reference is made to FIG. 2, which is a flowchart of selecting a candidate hard disk having a small allocated placement group count in a method for allocating a hard disk to a placement group according to an embodiment of the present disclosure. This embodiment aims at addressing an issue that in practice, a serious malfunction may be resulted from a single node fault when the target hard disks are in a same storage device.

In step S201, two candidate hard disks are selected from the table based on the ascending order, repeatedly, until a quantity of the one or more target hard disks is equal to the quantity of the required hard disks, where the two candidate hard disks are consecutive in the ascending order.

In step S202, it is determined whether the two candidate hard disks are located in a same storage device.

In step S203, both of the two candidate hard disks are determined as the target hard disk, in a case that the two candidate hard disks are not located in the same storage device.

In step S204, either of the two candidate hard disks is determined as the target hard disk, in a case that the two candidate hard disks are located in the same storage device.

In this embodiment, two candidate hard disks are selected based on the ascending order from the table of allocated placement group counts each time, and the two candidate hard disks are consecutive in the ascending order. That is, pair-wise comparison is performed to determine whether the consecutive two candidate hard disks are in the same storage device. Both of the two candidate hard disks may serve as the target hard disks, and a count of the target disks is increased by 2, in case of being located in different storage devices. Either of the two candidate hard disks is selected as the target hard disk, and a count of the target disks is increased by 1, in case of being two different hard disks in the same storage device. The above operations are repeated until the count of target hard disks is equal to the quantity of the required hard disks.

It is appreciated that only determination between the two consecutive two candidate hard disks are described in this embodiment, and there may be a case that two hard disks selected in a first time and two hard disks selected in a second time are also located in the same storage device. Although only the single node fault is addressed in the method according to this embodiment, such case can be addressed through an additional determination under a similar principle. Accordingly, those skilled in the art may easily obtain an implementation with a better effect, so as to avoid a serious problem due to the single node fault as far as possible for improving evenness of data distribution. Such implementation is not described in detail herein.

Third Embodiment

Figure 3:
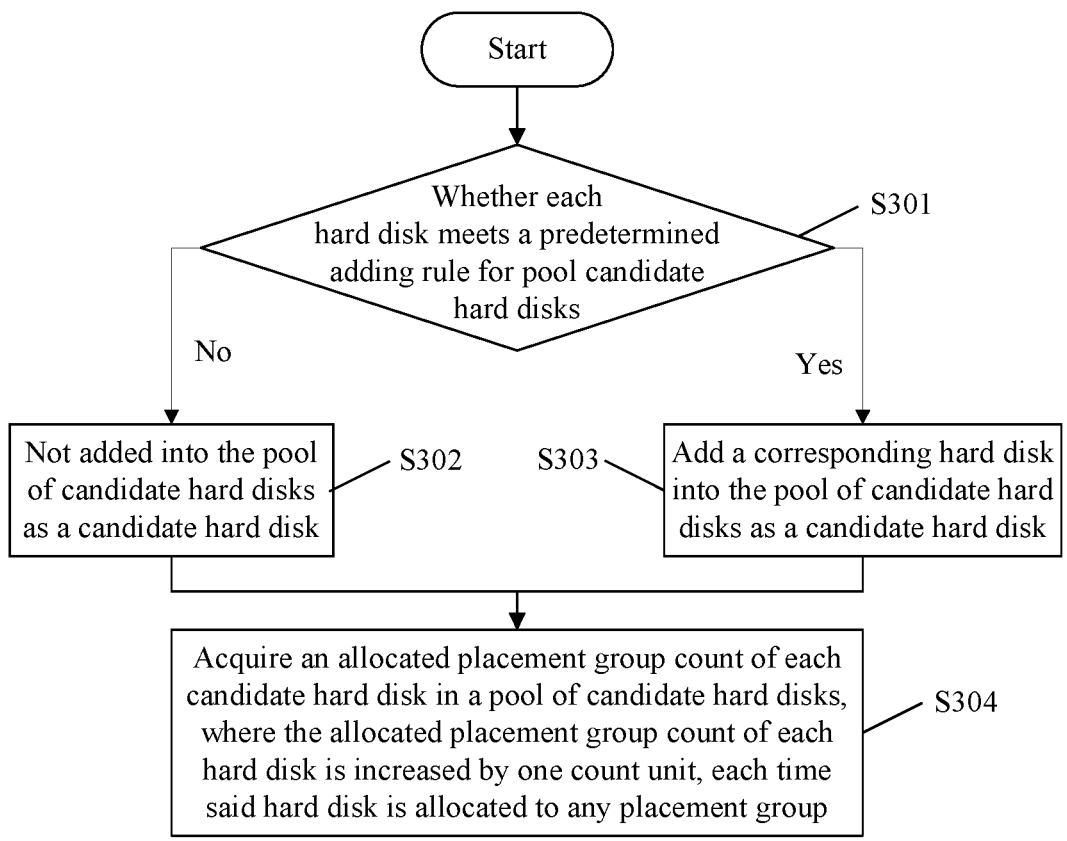
FIG. 3 is a flowchart of determining whether a hard disk is capable to be added into a pool of candidate hard disks as a candidate hard disk in a method for allocating a hard disk to a placement group according to an embodiment of the present disclosure.

Hereinafter reference is made to FIG. 3, which is a flowchart of determining whether a hard disk is capable to be added into a pool of candidate hard disks as a candidate hard disk in a method for allocating a hard disk to a placement group according to an embodiment of the present disclosure.

In step S301, it is determined for each hard disk, whether said hard disk meets a predetermined adding rule for the pool candidate hard disks.

The adding rule for the pool candidate hard disks at least one of: an interval between a moment of a last increase of the allocated placement group count and a current moment being greater than a predetermined interval, the allocated placement group count being less than an upper limit, or a current occupancy rate of said hard disk being less than a threshold.

It is appreciated that the adding rule for the pool candidate hard disks may not be limited to above parameters. Other rules for discrimination may be set based on a practical condition. Each rule may be independently applied to reach a discrimination conclusion, or, multiple rules may be combined to obtain a more comprehensive and practical discrimination manner, both of which aims at improving evenness of data distribution as far as possible.

In step S302, the hard disk is not capable to be added into the pool of candidate hard disks as the candidate hard disk.

This step is performed based on a determination result that the hard disk does not meet the adding rule for the pool of candidate hard disks in the step S301. For example, the adding rule is the interval between the moment of the last increase of the allocated placement group count and the current moment being greater than the predetermined interval. In case of determining the interval between the moment of the last increase of the allocated placement group count and the current moment is not greater than the predetermined interval, it is determined that the hard disk is not suitable to be added into the pool of candidate hard disks as the candidate hard disk.

In step S303, the hard disk is added into the pool of candidate hard disks as the candidate hard disk.

This step is performed based on a determination result that the hard disk meets the adding rule for the pool of candidate hard disks in the step S301. For example, the adding rule is the interval between the moment of the last increase of the allocated placement group count and the current moment being greater than the predetermined interval. In case of determining the interval between the moment of the last increase of the allocated placement group count and the current moment is greater than the predetermined interval, it is determined that the hard disk is suitable to be added into the pool of candidate hard disks as the candidate hard disk.

In step S304, the allocated placement group count of each candidate hard disk in the pool of candidate hard disks is acquired. Each time a hard disk is allocated to any placement group, the allocated placement group count of such hard disk is increased by one count unit.

On the basis of any foregoing embodiments, an adding rule is set for candidate hard disks in this embodiment. It is determined in advance whether each hard disk is suitable to be allocated to a placement group, and evenness of data distribution and stability of data can be further improved.

Fourth Embodiment

In this embodiment, an implementation scheme suitable for a specific application scenario is provided as follows.

Hereinafter described is a detailed implementation process of a method for optimizing PG distribution evenness.

(1) Each time a hard disk is allocated to a PG multiple hard disks are selected once together through a stochastic algorithm (for example, three hard disks are selected, where a quantity of the selected hard disks may be another appropriate number, and is not necessary to be large).

(2) A hard disk allocated to a minimum number of PGs is selected from the multiple selected hard disks, as a final selected hard disk, and a PG distribution number of such hard disk is increased by 1.

(3) The above selections are cycled until hard disks of a required quantity are allocated to the PG It is necessary to ensure that in each cycle, the selected target hard disk and each previously selected target hard disk are located in different storage devices.

(4) In a case that a hard disk quits a cluster due to a fault, another hard disk is allocated to a PG to which the quitting hard disk is allocated, through the above method.

(5) In a case that a new hard disk is added (such as a volume is expanded, or a new hard disk is inserted on a node), a loop operation is performed on all PGs as follows. For each PG a hard disk allocated to a maximum number of PGs is selected from all hard disks that are allocated to the PG and such hard disk is replaced with one of the newly added hard disks. In this way, one of hard disks is replaced each time for each PG and the replacement is performed for the PGs one after another, until a quantity of PGs to which the newly added hard disk is allocated is equal to a quantity of PGs to which the original hard disk pertains.

It is impossible to enumerate and describe all cases due to complexity of conditions. Those skilled in the art should appreciate that various examples may be obtained by combining, without any creative effort, a practical situation with a basis principle of the method according to embodiments of the present disclosure. Such obtained examples should fall within the protection scope of the present disclosure.

Figure 4:
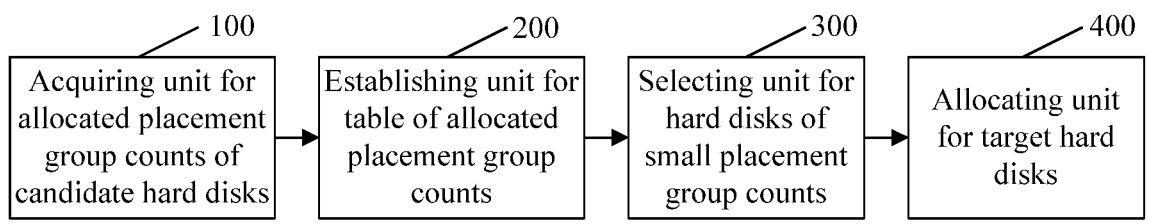
FIG. 4 is a structural block diagram of a system for allocating a hard disk to a placement group according to an embodiment of the present disclosure.

Hereinafter reference is made to FIG. 4, which is a structural block diagram of a system for allocating a hard disk to a placement group according to an embodiment of the present disclosure. The system for allocating a hard disk to a placement group may include an acquiring unit 100 for allocated placement group counts of candidate hard disks, an establishing unit 200 for table of allocated placement group counts, a selecting unit 300 for hard disks of small placement group counts, and an allocating unit 400 for target hard disks.

The acquiring unit 100 for allocated placement group counts of candidate hard disks is configured to acquire an allocated placement group count of each candidate hard disk in a pool of candidate hard disks, where the allocated placement group count of each hard disk is increased by one count unit, each time said hard disk is allocated to any placement group.

The establishing unit 200 for table of allocated placement group counts is configured to establish a table of allocated placement group counts based on the allocated placement group count, where the table reflects a correspondence between each candidate hard disk and the corresponding placement group count.

The selecting unit 300 for hard disks of small placement group counts is configured to selecting one or more candidate hard disks from the table, based on an ascending order of the allocated placement group count, to obtain one or more target hard disks, where a quantity of the one or more candidate hard disks is equal to a quantity of hard disks required by a target placement group.

The allocating unit 400 for target hard disks is configured to allocate the one or more target hard disks to the target placement group.

In one embodiment, the selecting unit 300 for hard disks of small placement group counts may include a selecting subunit for two consecutive candidate hard disks, a determining subunit for same storage devices, a processing subunit for different storage devices, and a processing subunit for same storage devices.

The selecting subunit for two consecutive candidate hard disks is configured to select two candidate hard disks from the table based on the ascending order, repeatedly, until a quantity of the one or more target hard disks is equal to the quantity of the required hard disks, where the two candidate hard disks are consecutive in the ascending order.

The determining subunit for same storage devices is configured to determine whether the two candidate hard disks are located in a same storage device.

The processing subunit for different storage devices is configured to determine both of the two candidate hard disks as the target hard disks, in a case that the two candidate hard disks are not located in the same storage device.

The processing subunit for same storage devices is configured to select either of the two candidate hard disks as the target hard disk, in a case that the two candidate hard disks are located in the same storage device.

In one embodiment, the system for allocating the hard disk to the placement group may further include a judging unit for candidate hard disks and a determining unit for candidate hard disks.

The judging unit for candidate hard disks is configured to, for each hard disk, determine whether said hard disk meets a predetermined adding rule for the pool candidate hard disks. The predetermined adding rule includes at least one of: an interval between a moment of a last increase of the allocated placement group count and a current moment being greater than a predetermined interval, the allocated placement group count being less than an upper limit, or a current occupancy rate of said hard disk being less than a threshold.

The determining unit for candidate hard disks is configured to: for each hard disk, add said hard disk into the pool of candidate hard disks as a candidate hard disk, in response to said hard disk meeting the predetermined adding rule.

In one embodiment, the system for allocating the hard disk to the placement group may further include a determining unit for to-be-replaced hard disks and a replacing unit.

The determining unit for to-be-replaced hard disks is configured to determine, for each placement group, a hard disk with a maximum allocated placement group count, to obtain a to-be-replaced hard disk, in response to a new hard disk being added to a storage system.

The replacing unit is configured to replace the to-be-replaced hard disk with the new hard disk, for each placement group.

On the basis of the foregoing embodiments, an apparatus for allocating a hard disk to a placement group is further provided according to an embodiment of the present disclosure. The device may include a memory and a processor. The memory stores a computer program. The processor when invoking the computer program stored in the memory implements the steps provided in the foregoing embodiments. It is appreciated that the device may further include various necessary network interfaces, power supplies, and other components.

A computer readable storage medium is further provided according to an embodiment of the present disclosure. The computer readable storage medium stores a computer program. The computer program, when executed by an executive terminal or a processor, implements the steps provided in the foregoing embodiments. The storage medium may include various media capable to store a program code, for example, a USB flash disk, a mobile hard disk, a read-only memory (ROM), a random access memory (RAM), a diskette, or a light disk.

The embodiments of the present disclosure are described in a progressive manner, and each embodiment places emphasis on the difference from other embodiments. Therefore, one embodiment can refer to other embodiments for the same or similar parts. Since apparatuses disclosed in the embodiments correspond to methods disclosed in the embodiments, the description of apparatuses is simple, and reference may be made to the relevant part of methods.

As further be appreciated by those skilled in the art, the units and algorithmic steps in the examples described according to the embodiments disclosed herein can be implemented in forms of electronic hardware, computer software or the combination of the both. To illustrate the interchangeability of the hardware and the software clearly, the components and the steps in the examples are described generally according to functions in the above description. Whether hardware or software is used to implement the functions depends on a specific application and design constraints for the technical solution. For each specific application, different methods may be used by those skilled in the art to implement the described function, and such implementation should not be considered to depart from the scope of the present disclosure.

Principles and embodiments of the present disclosure are described herein by using specific examples. Descriptions of the above embodiments are only intended to help understand the method and the core concept of the present disclosure. Those skilled in the art can make various modifications and variations to the present disclosure without departing from the principles of the present disclosure. The modifications and variations fall within the protection scope of the claims of the present disclosure.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The invention claimed is:

1. A method for allocating a hard disk to a placement group, comprising:
    acquiring an allocated placement group count of each candidate hard disk in a pool of candidate hard disks, wherein the allocated placement group count of each hard disk is increased by one count unit, each time said hard disk is allocated to any placement group;
    establishing a table of allocated placement group counts based on the allocated placement group count, wherein the table reflects a correspondence between each candidate hard disk and the corresponding placement group count;
    selecting one or more candidate hard disks from the table, based on an ascending order of the allocated placement group count, to obtain one or more target hard disks, wherein a quantity of the one or more candidate hard disks is equal to a quantity of hard disks required by a target placement group; and
    allocating the one or more target hard disks to the target placement group.

2. The method according to claim 1, wherein selecting the one or more candidate hard disks from the table based on the ascending order of the allocated placement group count to obtain the one or more target hard disk comprises:
    selecting two candidate hard disks from the table based on the ascending order, repeatedly, until a quantity of the one or more target hard disks is equal to the quantity of the required hard disks, wherein the two candidate hard disks are consecutive in the ascending order;
    determining whether the two candidate hard disks are located in a same storage device;
    determining both of the two candidate hard disks as the target hard disks, in a case that the two candidate hard disks are not located in the same storage device; and
    selecting either of the two candidate hard disks as the target hard disk, in a case that the two candidate hard disks are located in the same storage device.

3. The method according to claim 1, further comprising:
    for each hard disk,
        determining whether said hard disk meets a predetermined adding rule for the pool candidate hard disks, wherein the predetermined adding rule includes at least one of:
            an interval between a moment of a last increase of the allocated placement group count and a current moment being greater than a predetermined interval,
            the allocated placement group count being less than an upper limit, or
            a current occupancy rate of said hard disk being less than a threshold; and
        adding said hard disk into the pool of candidate hard disks as a candidate hard disk, in response to said hard disk meeting the predetermined adding rule.

4. The method according to claim 3, further comprising:
determining, for each placement group, a hard disk with a maximum allocated placement group count, to obtain to-be-replaced hard disk, in response to a new hard disk being added to a storage system; and
replacing the to-be-replaced hard disk in each placement group with the new hard disk.

5. The method according to claim 2, further comprising:
for each hard disk,
determining whether said hard disk meets a predetermined adding rule for the pool candidate hard disks, wherein the predetermined adding rule includes at least one of:
an interval between a moment of a last increase of the allocated placement group count and a current moment being greater than a predetermined interval,
the allocated placement group count being less than an upper limit, or
a current occupancy rate of said hard disk being less than a threshold; and
adding said hard disk into the pool of candidate hard disks as a candidate hard disk, in response to said hard disk meeting the predetermined adding rule.

6. The method according to claim 5, further comprising:
determining, for each placement group, a hard disk with a maximum allocated placement group count, to obtain to-be-replaced hard disk, in response to a new hard disk being added to a storage system; and
replacing the to-be-replaced hard disk in each placement group with the new hard disk.

7. An apparatus for allocating a hard disk to a placement group, comprising:
a memory, configured to store a computer program; and
a processor, configured to implement the method comprising:
acquiring an allocated placement group count of each candidate hard disk in a pool of candidate hard disks, wherein the allocated placement group count of each hard disk is increased by one count unit, each time said hard disk is allocated to any placement group;
establishing a table of allocated placement group counts based on the allocated placement group count, wherein the table reflects a correspondence between each candidate hard disk and the corresponding placement group count;
selecting one or more candidate hard disks from the table, based on an ascending order of the allocated placement group count, to obtain one or more target hard disks, wherein a quantity of the one or more candidate hard disks is equal to a quantity of hard disks required by a target placement group; and
allocating the one or more target hard disks to the target placement group.

8. The apparatus according to claim 7, wherein selecting the one or more candidate hard disks from the table based on the ascending order of the allocated placement group count to obtain the one or more target hard disk comprises:
selecting two candidate hard disks from the table based on the ascending order, repeatedly, until a quantity of the one or more target hard disks is equal to the quantity of the required hard disks, wherein the two candidate hard disks are consecutive in the ascending order;
determining whether the two candidate hard disks are located in a same storage device;
determining both of the two candidate hard disks as the target hard disks, in a case that the two candidate hard disks are not located in the same storage device; and
selecting either of the two candidate hard disks as the target hard disk, in a case that the two candidate hard disks are located in the same storage device.

9. The apparatus according to claim 8, wherein the method further comprises:
for each hard disk,
determining whether said hard disk meets a predetermined adding rule for the pool candidate hard disks, wherein the predetermined adding rule includes at least one of:
an interval between a moment of a last increase of the allocated placement group count and a current moment being greater than a predetermined interval,
the allocated placement group count being less than an upper limit, or
a current occupancy rate of said hard disk being less than a threshold; and
adding said hard disk into the pool of candidate hard disks as a candidate hard disk, in response to said hard disk meeting the predetermined adding rule.

10. The apparatus according to claim 9, wherein the method further comprises:
determining, for each placement group, a hard disk with a maximum allocated placement group count, to obtain to-be-replaced hard disk, in response to a new hard disk being added to a storage system; and
replacing the to-be-replaced hard disk in each placement group with the new hard disk.

11. The apparatus according to claim 7, wherein the method further comprises:
for each hard disk,
determining whether said hard disk meets a predetermined adding rule for the pool candidate hard disks, wherein the predetermined adding rule includes at least one of:
an interval between a moment of a last increase of the allocated placement group count and a current moment being greater than a predetermined interval,
the allocated placement group count being less than an upper limit, or
a current occupancy rate of said hard disk being less than a threshold; and
adding said hard disk into the pool of candidate hard disks as a candidate hard disk, in response to said hard disk meeting the predetermined adding rule.

12. The apparatus according to claim 11, wherein the method further comprises:
determining, for each placement group, a hard disk with a maximum allocated placement group count, to obtain to-be-replaced hard disk, in response to a new hard disk being added to a storage system; and
replacing the to-be-replaced hard disk in each placement group with the new hard disk.

13. A non-transitory computer readable storage medium, storing a computer program, wherein:
the computer program when executed by a processor implements the method comprising:
acquiring an allocated placement group count of each candidate hard disk in a pool of candidate hard disks, wherein the allocated placement group count of each hard disk is increased by one count unit, each time said hard disk is allocated to any placement group;

establishing a table of allocated placement group counts based on the allocated placement group count, wherein the table reflects a correspondence between each candidate hard disk and the corresponding placement group count;

selecting one or more candidate hard disks from the table, based on an ascending order of the allocated placement group count, to obtain one or more target hard disks, wherein a quantity of the one or more candidate hard disks is equal to a quantity of hard disks required by a target placement group; and allocating the one or more target hard disks to the target placement group.

14. The non-transitory computer readable storage medium according to claim 13, wherein selecting the one or more candidate hard disks from the table based on the ascending order of the allocated placement group count to obtain the one or more target hard disk comprises:

selecting two candidate hard disks from the table based on the ascending order, repeatedly, until a quantity of the one or more target hard disks is equal to the quantity of the required hard disks, wherein the two candidate hard disks are consecutive in the ascending order;

determining whether the two candidate hard disks are located in a same storage device;

determining both of the two candidate hard disks as the target hard disks, in a case that the two candidate hard disks are not located in the same storage device; and selecting either of the two candidate hard disks as the target hard disk, in a case that the two candidate hard disks are located in the same storage device.

15. The non-transitory computer readable storage medium according to claim 14, wherein the method further comprises:

for each hard disk,
determining whether said hard disk meets a predetermined adding rule for the pool candidate hard disks, wherein the predetermined adding rule includes at least one of:
an interval between a moment of a last increase of the allocated placement group count and a current moment being greater than a predetermined interval,
the allocated placement group count being less than an upper limit, or
a current occupancy rate of said hard disk being less than a threshold; and adding said hard disk into the pool of candidate hard disks as a candidate hard disk, in response to said hard disk meeting the predetermined adding rule.

16. The non-transitory computer readable storage medium according to claim 15, wherein the method further comprises:

determining, for each placement group, a hard disk with a maximum allocated placement group count, to obtain to-be-replaced hard disk, in response to a new hard disk being added to a storage system; and replacing the to-be-replaced hard disk in each placement group with the new hard disk.

17. The non-transitory computer readable storage medium according to claim 13, wherein the method further comprises:

for each hard disk,
determining whether said hard disk meets a predetermined adding rule for the pool candidate hard disks, wherein the predetermined adding rule includes at least one of:
an interval between a moment of a last increase of the allocated placement group count and a current moment being greater than a predetermined interval,
the allocated placement group count being less than an upper limit, or
a current occupancy rate of said hard disk being less than a threshold; and adding said hard disk into the pool of candidate hard disks as a candidate hard disk, in response to said hard disk meeting the predetermined adding rule.

18. The non-transitory computer readable storage medium according to claim 17, wherein the method further comprises:

determining, for each placement group, a hard disk with a maximum allocated placement group count, to obtain to-be-replaced hard disk, in response to a new hard disk being added to a storage system; and replacing the to-be-replaced hard disk in each placement group with the new hard disk.

* * * * *